US007581178B2

(12) United States Patent
Hays et al.

(10) Patent No.: US 7,581,178 B2
(45) Date of Patent: Aug. 25, 2009

(54) SYSTEMS AND METHODS FOR PAGINATION USING VARIABLE PAGE DIMENSIONS

(75) Inventors: Christopher Alan Hays, Monroe, WA (US); Jason D. Carlson, Redmond, WA (US); Nicoleta Cristache, Redmond, WA (US); Mohammad A. Rashid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 10/902,985

(22) Filed: Jul. 30, 2004

(65) Prior Publication Data

US 2006/0026512 A1 Feb. 2, 2006

(51) Int. Cl.
*G06N 3/00* (2006.01)

(52) U.S. Cl. .................................................... 715/243

(58) Field of Classification Search ................. 715/517, 715/509, 525, 530, 518, 520, 521, 513, 523, 715/243, 244, 245, 246, 247, 248, 249, 250, 715/251, 252, 784, 786, 787
See application file for complete search history.

(56) References Cited

U.S. PATENT DOCUMENTS

| 6,639,611 | B1 * | 10/2003 | Leduc | 715/764 |
|---|---|---|---|---|
| 6,785,013 | B1 * | 8/2004 | Ota et al. | 358/1.15 |
| 6,832,352 | B1 * | 12/2004 | Dooley | 715/234 |
| 2002/0049702 | A1 * | 4/2002 | Aizikowitz et al. | 707/1 |
| 2004/0068698 | A1 * | 4/2004 | Wu et al. | 715/525 |
| 2004/0174563 | A1 * | 9/2004 | Cassidy et al. | 358/1.18 |
| 2004/0261017 | A1 * | 12/2004 | Perry | 715/513 |
| 2005/0080765 | A1 * | 4/2005 | Dettinger et al. | 707/3 |
| 2005/0081145 | A1 * | 4/2005 | Schwartzkopf | 715/517 |
| 2005/0097448 | A1 * | 5/2005 | Giannetti et al. | 715/508 |
| 2005/0234930 | A1 * | 10/2005 | Hop Hing et al. | 707/100 |

OTHER PUBLICATIONS

Brüggemann-Klein, A. et al., "On the Pagination of Complex Documents," *Computer Science in Perspective*, Klein, R. et al. (eds.), Springer-Verlag, Berlin, Germany, 2003, 49-68.
González, J. et al., "Optimizing Web Newspaper Layout Using Simulated Annealing," *Engineering Applications of Bio-Inspired Artificial Neural Networks. International Work-Conference on Artificial and Natural Neural Networks, IWANN'99*, Alicante, Spain, Jun. 2-4, 1999, 759-768.
Kim, H.S. et al., "Estimating Influence of Data Layout Optimizations on SDRAM Energy Consumption," *ISLPED'03. Proceedings of the 2003 International Symposium on Low Power Electronics and Design*, Seoul, South Korea, Aug. 25-27, 2003, 40-43.

* cited by examiner

*Primary Examiner*—Stephen S Hong
*Assistant Examiner*—Kyle R Stork
(74) *Attorney, Agent, or Firm*—Woodcock Washburn LLP

(57) ABSTRACT

On-line or computer based document generation and consumption has become as common, or more so, than paper based document generation and consumption. With the move away from paper there is no longer the physical restriction of the paper on which a document may be printed. It is still desirable, however, to break documents into readable pages. We allow a selection of logical page breaks at locations that are deemed convenient, also allow for selection of approximate page dimensions for pages within each logical section. Because these pages are approximate, pagination is less computationally expensive than fixed pagination. Moreover, many of the appearance problems that plague fixed pagination dissolve.

30 Claims, 9 Drawing Sheets

SYSTEMS AND METHODS FOR PAGINATION USING VARIABLE PAGE DIMENSIONS

CROSS-REFERENCE TO RELATED APPLICATIONS

The subject matter described in this application is related to the subject matter described in co-pending U.S. application Ser. No. 10/400,734, filed on Mar. 27, 2003, entitled "Defining a report based on data regions and including custom data in a report definition," and to co-pending U.S. application Ser. No. 10/875,832, filed on Jun. 23, 2004, entitled "Systems and Methods for Flexible Report definitions Including table, Matrix, and hybrid designs."

FIELD OF THE INVENTION

This invention relates to pagination of electronically generated documents, and more particularly to efficient techniques for separating documents into a plurality of pages when the documents are not constrained by physical media such as paper.

BACKGROUND OF THE INVENTION

Pagination is the placement of document items onto pages. If no pagination is conducted, all the data for a document can be presented in one single electronic display. A consumer of such a document can scroll horizontally and/or vertically to bring all of the items of such an unpaginated document into view. On the other hand, if a document is paginated, separate pages of fixed dimensions may be presented as visually discrete entities, allowing consumers to view and/or interact with the items of a document one page at a time.

Historically, when electronically generated documents are paginated, the pages have had fixed dimensions. There are various standard fixed page dimensions available, such as the standard letter 8½×11 inch size, the legal 8½×14 inch size, the "A4" size, and so on. Moreover, the fixed page dimensions for a particular document may be customizable, allowing a software user to specify nonstandard fixed page dimensions for the pages of a document. Still further, some software may allow a user to specify fixed page dimensions on a page-by-page basis, allowing for multiple fixed page dimensions in a single document.

The reason for fixed page dimensions of electronic documents is at least in part because many documents are designed for printing on paper. Paper size will not automatically grow or shrink as necessary to accommodate the items on a page of a document. Moreover, it is generally desirable to present paper pages that are both fixed and uniform. Paper pages will generally be stacked on top of one another in multi-page documents, and pages of different sizes make such a document difficult to stack. However, businesses and individuals are storing more information electronically everyday. For example, in the field of reporting, it is now common for businesses to have up to several billion rows of structured data spanning from tens to hundreds of gigabytes of storage. Most of such reporting documents may never be reduced to paper form.

Pagination of electronic documents with fixed page dimensions ("fixed pagination") can be computationally expensive. In general, fixed pagination involves determining the aggregate length of all items that may be on a page, and comparing the result to the fixed length of a page. If the items cannot all fit on the page, some items or portions of items may be moved to a subsequent page. These items may then be included in a pagination calculation for the subsequent page.

FIG. 1a illustrates a page 100 with items that have a combined length dimension which is too large for the length of the page 130. To calculate this combined length dimension, the length 110, 111, 112, 113, etc. of the various items can first be determined. This determination may be straightforward in the case of an item such as the top margin 105, requiring only a lookup of the margin length 110.

The length determination may be more tedious, however, in the case of an item with child items. Refer to first item 101. First item 101 may grow or shrink depending on the length of the various child items 101a-101i. Consider a case where most of the child items 101a-101i are one-half inch in length, but child item 101d is one full inch in length. In other words, 112c equals one inch, while 112a and 112b are both one-half inch. In this example, the total length of the second row of first item 101 will be one-half inch greater than might be expected. This one-half inch may affect the determination of which items can or cannot fit on the page 100. The one-half inch may thus also affect the determination of which items can or cannot fit on any subsequent page in the document. Therefore, fixed page-size pagination can be computationally expensive, because it entails a detailed inspection of the dimensions of all items that may be placed on a page. Moreover, the results of the computation for each page may affect the computation for subsequent pages.

FIG. 1b demonstrates that a number of additional features are often added to the basic pagination computations described above. The basic pagination computations typically adhere to a set of rules 150 that is sufficient to at least place all items in a document within the confines of the fixed-size pages. However, it may be desirable to also provide additional pagination features, and many software programs do so. The rules for first additional features 151, second additional features 152, and third additional features 153 represent exemplary rules for performing pagination computations that may be helpful, but not necessary, to those generating and consuming documents with fixed dimension pages.

One example of a rule for an additional feature such as may be included in 151, 152, or 153 is known as "keep together." Keep together allows a user to designate two or more items that should be presented on a same page. If one item cannot fit on a page, and will therefore be moved to a subsequent page, any items that are designated via "keep together" to be presented on the same page must also be moved.

Another example of a rule for an additional feature is known as "orphan control." Orphan control prevents the unappealing appearance of a single item or very few items on the top of a new page. Such items are referred to as orphans. For example, the appearance of an orphan on the last page of a document is generally considered undesirable. Various measures may be taken to manipulate the items on previous pages of a document to prevent orphans. Needless to say, these manipulations do not come for free. They are at the expense of increasing the already large number of calculations involved in fixed pagination.

There are a host of such additional pagination features that may be included in rules for additional features 151, 152, and 153. Each such additional feature provides some benefit, at the cost of making fixed-page size pagination more computationally expensive than it could be if it followed only a set of basic fixed pagination rules 150.

Moreover, the additional computational expense provided by such additional features may not be sufficient to overcome the undesirable presentation effects that can result from requiring fixed page dimensions. For example, in the case of "keep together," there may be items that cannot be presented on a same fixed dimensions page, because their combined dimensions add up to a number larger than will fit on the page. In the case of orphan control, the adjustment of the various other items in a document to preempt the appearance of an orphan may create undesirable visual effects for the adjusted items.

In light of these heretofore unacknowledged deficiencies in the industry, there is an unaddressed need for new systems and methods for pagination that are less computationally expensive and can improve the appearance of documents that are not constrained by physical media.

SUMMARY OF THE INVENTION

In consideration of the above-identified shortcomings in the art, the present invention provides systems and methods for variable page size pagination ("variable pagination"). Online or computer based document generation and consumption has become as common, or more so, than paper based document generation and consumption. With the move away from paper there is no longer the physical restriction of the paper on which a document may be printed. It is still desirable, however, to break documents into readable pages. The invention allows a selection of logical page breaks at locations that are deemed convenient. It also allows for selection of target page dimensions for pages within each logical section. Because these pages are approximate, pagination is less computationally expensive than for fixed pagination. Also, many of the appearance problems that plague fixed pagination dissolve. Other advantages and features of the invention are described below.

BRIEF DESCRIPTION OF THE DRAWINGS

The systems and methods for variable pagination in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

This detailed description is divided into four sections. The first section discusses variable pagination rules. A corollary to this topic is the fixed pagination rules that are beneficial to avoid in preferred embodiments of the invention. This related topic is also discussed in the first section. The second section describes an exemplary implementation of the invention. The third section describes exemplary document production software that can implement the systems and methods of the invention, namely reporting software. The field of reporting is considered a good candidate for use of the invention because of the volume of data in this field that is preferably consumed in paginated electronic form. The fourth and last section gives an exemplary computing and networked environment suitable for use with the invention.

Variable Pagination Rules

It will be acknowledged that the systems and methods disclosed can be implemented via a variety of different rule sets. Some rule sets will account for more dimension information about the items to be placed on a page, while other rule sets will account for less dimension information. The invention is not limited to any particular set of variable pagination rules.

The difference between variable pagination rules and fixed pagination rules is that the former can account for less item dimension information than the latter. Thus, the set of possible variable pagination rules can be defined by what it is not: it is not a set of rules that accounts for all of the information needed in fixed pagination. As described in the background section, fixed pagination utilizes a minimum set of rules, 150 from FIG. 1b, that account for at least some minimum amount of information about the dimensions of items to be placed on a given page. Variable pagination, in contrast, is pagination which follows rules that account for any amount of information less than the minimum 150 required for fixed pagination. By accounting for less information that the minimum 150, significant computational efficiency can be gained.

Figure 3:
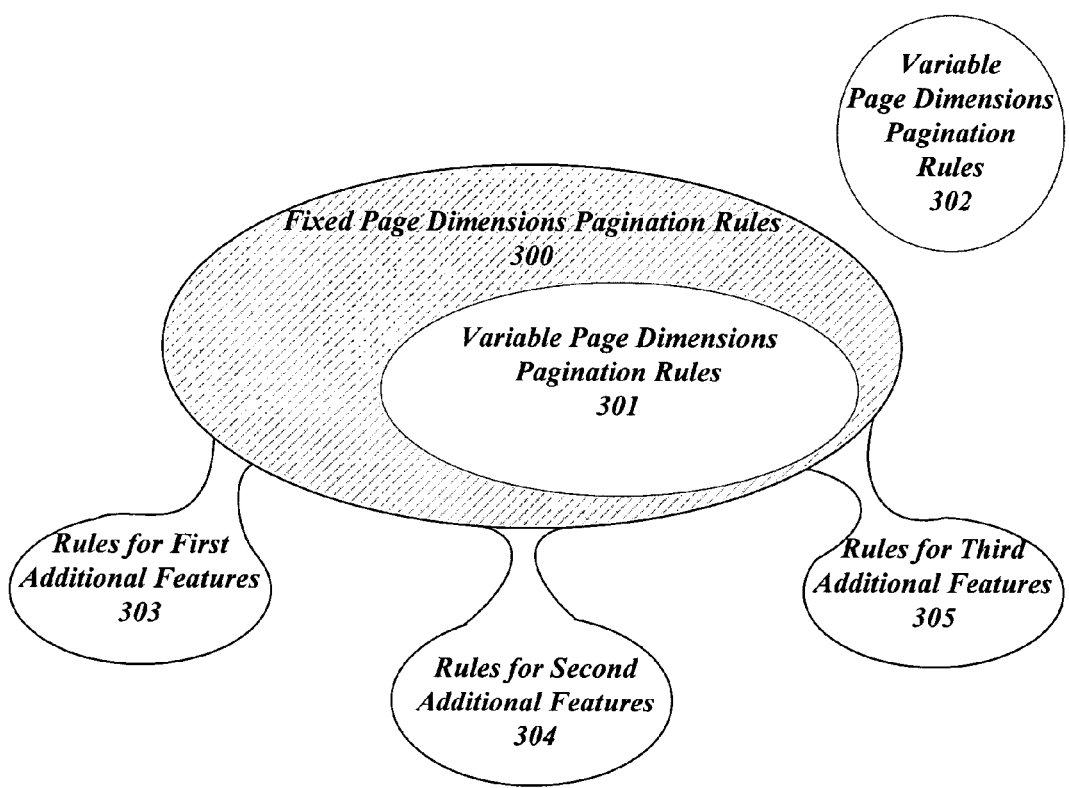
FIG. 3 illustrates variable pagination rules as a subset of fixed dimensions pagination rules. Variable pagination can engage in similar calculations to those involved in fixed pagination, except some of the computationally expensive determinations in fixed pagination can be selectively omitted, providing pages close to the desired size without the computation expense.

FIG. 3 illustrates the concept described above. The variable pagination rules 301 and 302 do not cover the same area as the minimum fixed pagination rules 300. There is at least some portion of the minimum rules 300 that are not accounted for by rules 301 and 302. As demonstrated by 302, there may be additional rules in variable pagination that are not within the scope of the minimum rules 300. However, some of the minimum rules 300 for fixed pagination remain uncovered. The various rules 300 that are most beneficial to omit in accordance with various embodiments of the invention, and the various rules 301 and 302 that are beneficial to include will be further described herein.

Because all rules 300 necessary for fixed pagination are not used, variable pagination by definition cannot always fit document items onto pages of a fixed and/or uniform size. As the name suggests, the pages generated in variable pagination will grow and shrink to accommodate the items that are placed on them. In general, variable pagination approximates the dimensions of items in a document, and then breaks the document into pages that are at or near a target dimension. As will be shown in the exemplary implementation section below, variable pagination can have break points at natural places, such as at the end of items. This may eliminate the need for additional processes used with fixed pagination such as widow and orphan control.

Figure 4:
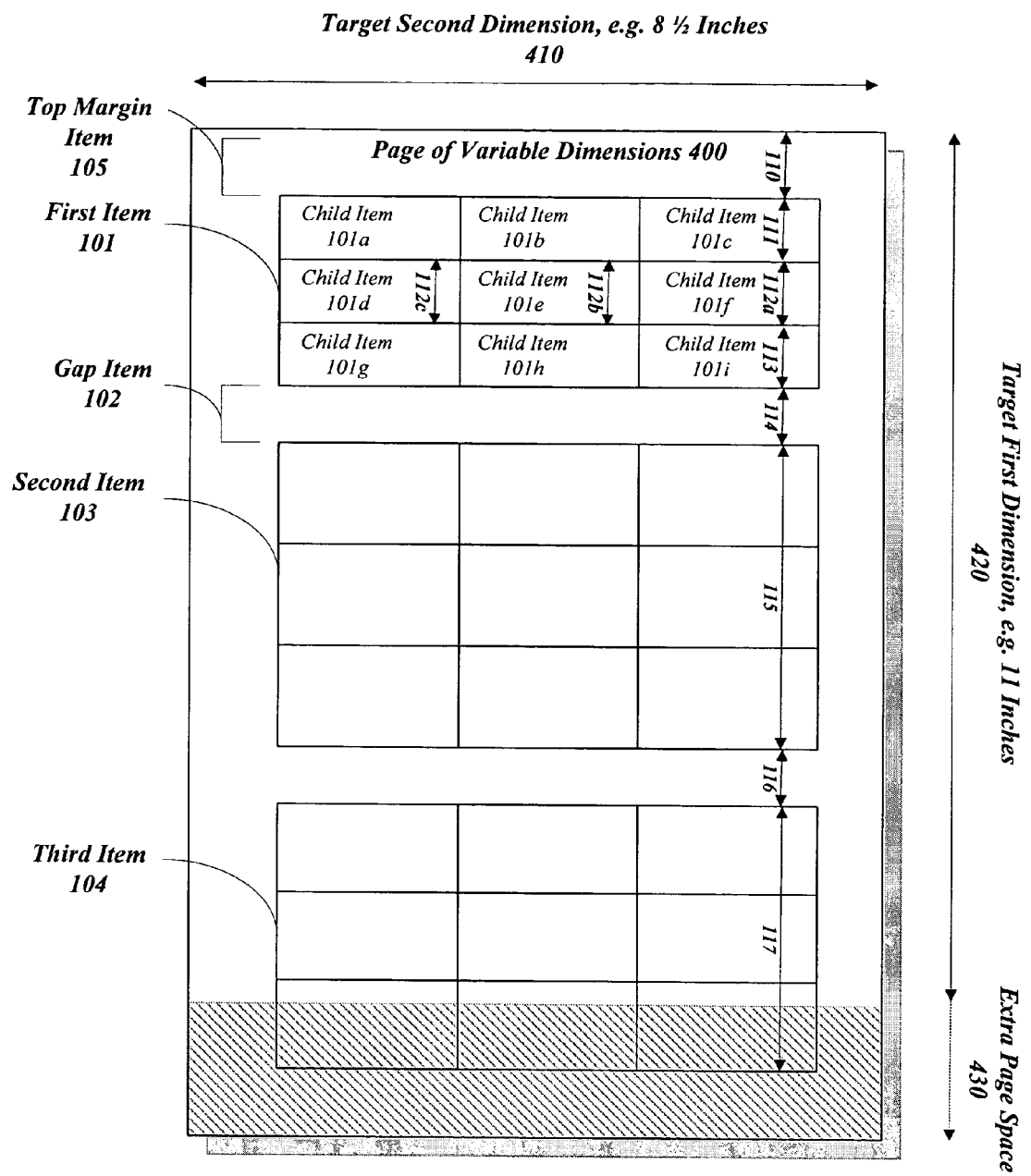
FIG. 4 illustrates how with variable pagination, the items of FIG. 1 can be placed on a single page. The page of variable dimensions 400 can be adjusted to fit the items that have been placed on it.

For the purpose of this specification, an item is a discrete data entity for display on a page of a document. Referring to FIG. 4, an item may be a margin such as top margin 105, a table or matrix such as first item, 101, second item 103, and third item 104, and a gap between items such as 102. An item could also be a paragraph, an image, an embedded data region, or any other such entity.

Further with reference to FIG. 4, note that variable pagination rules may allow for setting a target dimension such as 420 to provide general, if not exact, control over page 400 dimensions. Items 105, 101, 102, 103, etc. of either approximated or precisely calculated dimensions can be aggregated to fit within the target dimension 420 and placed on the page 400. If the aggregated items 105, 101, 102, 103 are slightly larger or smaller than the target dimension 420, the page 400 can be increased to include extra space 430 such that the items 105, 101, 102, 103 fit naturally on the page 400. Note that if the items in a document are of uniform and predictable size, then variable pagination may result in uniform page dimensions throughout a report. Such uniform dimensions may be also happen to be the target dimensions 410, 420 of a page.

Figure 1A:
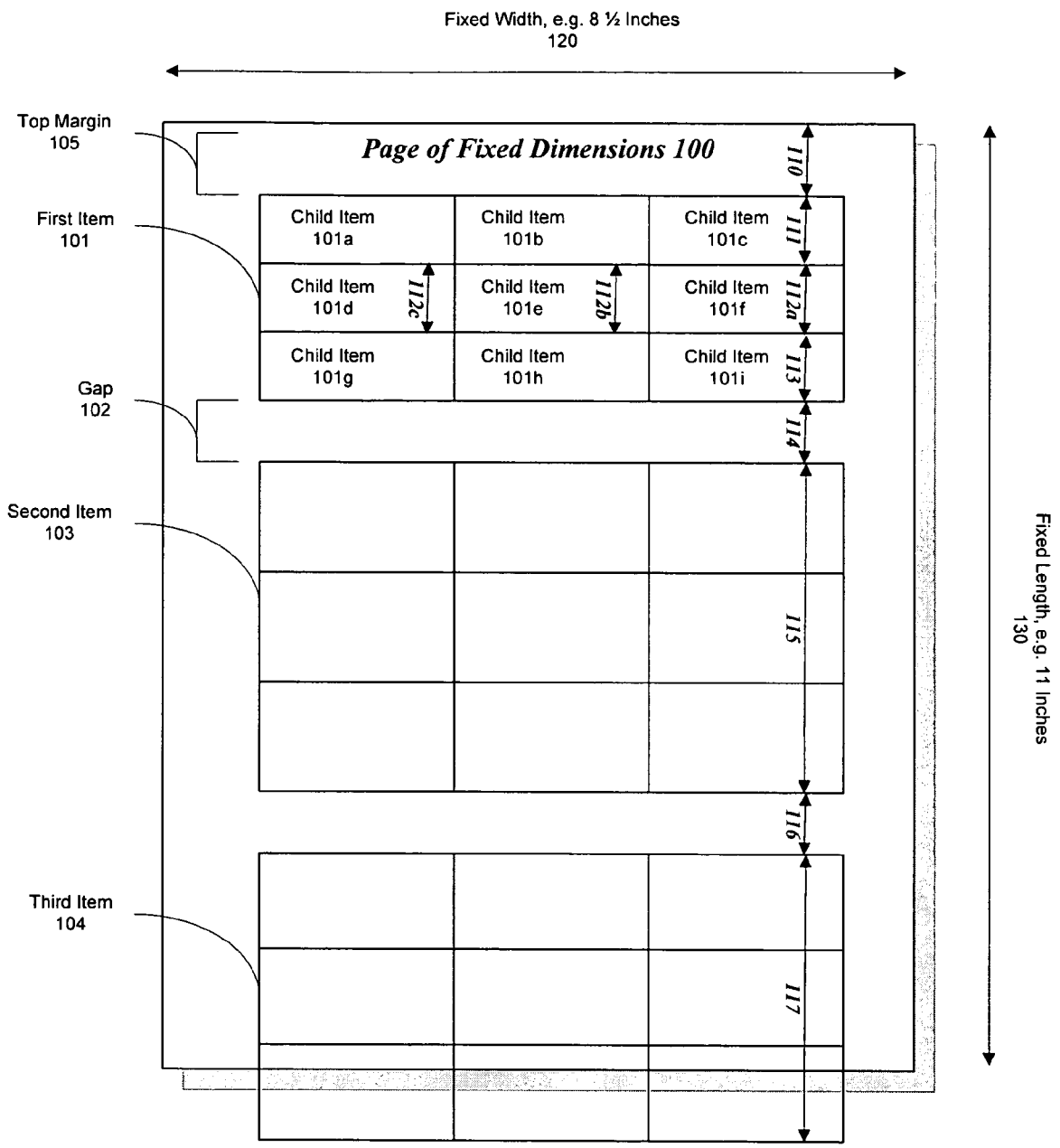
FIG. 1a illustrates a page of fixed dimensions and a plurality of items to be potentially placed on the page. An exact determination of the dimensional properties is used to determine which items can and cannot be placed on the page, and there may be some undesirable formatting choices that are made due to the fixed page dimensions constraint.
Figure 1B:
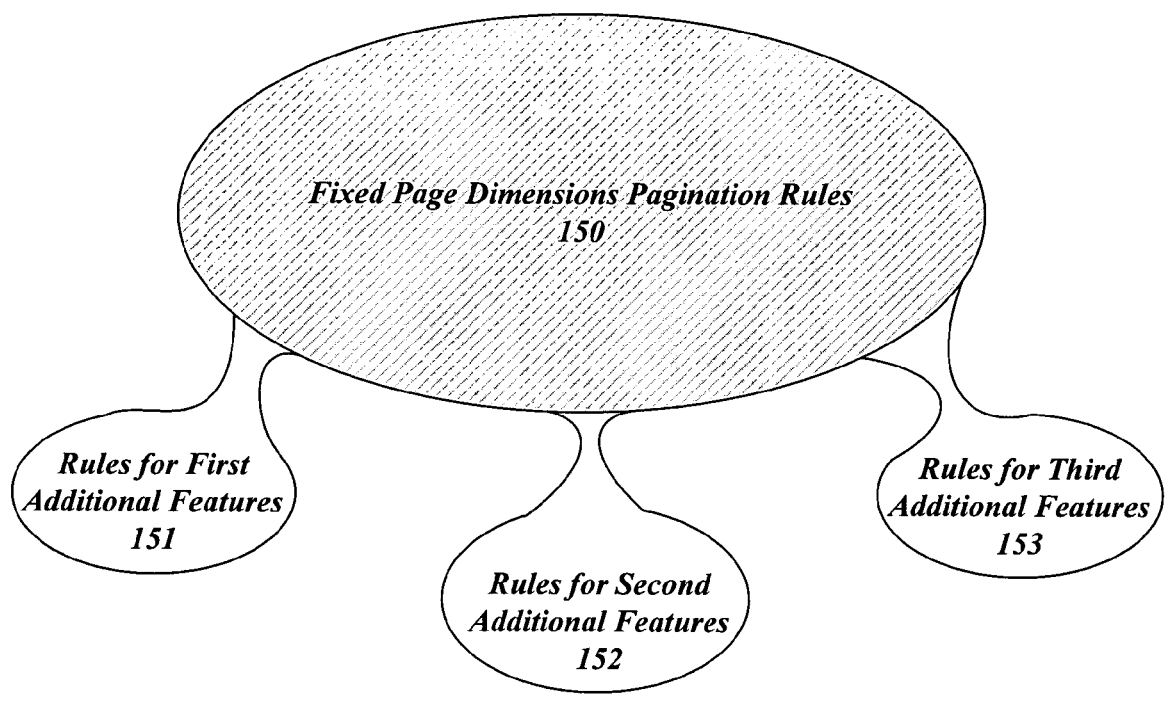
FIG. 1b illustrates the various rules that are used to paginate using fixed dimensions pages. A set of pagination rules 150 are used for the basic needs of placing items on pages, while additional rules 151, 152, 153 may provide some additional pagination features to help control undesirable appearance effects.

Referring back to FIG. 3, note the rules for first, second, and third additional features 303, 304, and 305 corresponding to 151, 152 and 153 from FIG. 1b. These additional features 303, 304, and 305 can be adapted to be used with rules 301 and 302. However, the features 303, 304, and 305 may in some cases be rendered obsolete by the basic pagination rules 301, 302 that are used. In other cases, additional features 303, 304, and 305 may become easier to implement and less computationally expensive.

In various embodiments, the portion of rules 300 that is not included in 301 and 302 can include rules that involve data-specific dimension changes. For example, referring to FIG. 4, child item 101d may contain data of a large font that increases the length 112c and thereby increases the length of the entire second row of first item 101. While an exact determination of the length of first item 101 may necessitate an investigation of the length dimension 112c, the length of item 101 may be quickly approximated by determining the number of rows, in this case three rows, and, for example, a default height for the rows. The number of rows can be multiplied by the default length of the rows to obtain a length dimension that is likely to be the approximate length of first item 101.

Additional rules from 300 that may be beneficially ignored in rules 301 and 302 are rules that account for image dimensions, the dimensions of embedded data regions, cross-page size consistency, repeat on new page, and growing/shrinking items. For example, fixed pagination requires a pagination process to account for resizing the contents of an item (e.g., due to font size change, variable-sized image contents, or long word-wrapping text) thereby causing the item to grow. Variable pagination provides the option to ignore such resizing during pagination, thereby acting as if items don't grow due to content size, and then later enlarging the page as necessary to account for the growth.

Typically, in reporting software, when items shrink and grow due to either content size or due to a varying number of contained data items, they "push" other items out of the way, maintaining relative position between the items. For variable pagination, one can choose to ignore this, acting as if the item was not pushed, and then later enlarging the page to account for the push.

Another example of fixed pagination rules that may be beneficially ignored in the context of reports is that of repeating headers. Repeating headers take up space. This space can be ignored during pagination and handled by subsequently enlarging the page to make room.

Some features that are commonly used, but not required for fixed pagination become simpler to implement with variable pagination. For example, orphan control can be simplified, since with variable pagination physical page size does not force orphans to enlist a peer from a previous page to "keep it company" on a new page, which in fixed pagination results in requiring everything on an orphan's page to be moved down, and can force additional items off the page. Instead, with variable pagination, the previous page can simply be enlarged to make room for the orphan.

Another pagination feature that can be simplified is keep together. With variable pagination, physical page size does not force a page-spanning item to move to the next page in order to keep it on one page. Instead, the page can be enlarged to make room for the rest of the item. This greatly simplifies the pagination calculation, conserving processing resources as well as creating a visual effect that may be preferred in many settings.

Various embodiments may benefit from preserving certain pagination rules from 300 and/or importing typical rules from 303, 304, and 305 into 301 and 302. A determination of which rules 300 to preserve may depend on that application that is generating a document. For example, different pagination preferences may apply in the report generation setting than in the word processing setting. In the reporting setting, the following rules are considered exemplary candidates for continued use: rules for calculating the precise dimensions of lists, rules for calculating the precise dimensions of tables, and rules for calculating the precise dimensions of matrices. These three types of items may frequently merit more than an approximation of size, because the items themselves typically need detailed processing prior to presentation, regardless of what page these items land on.

Figure 5:
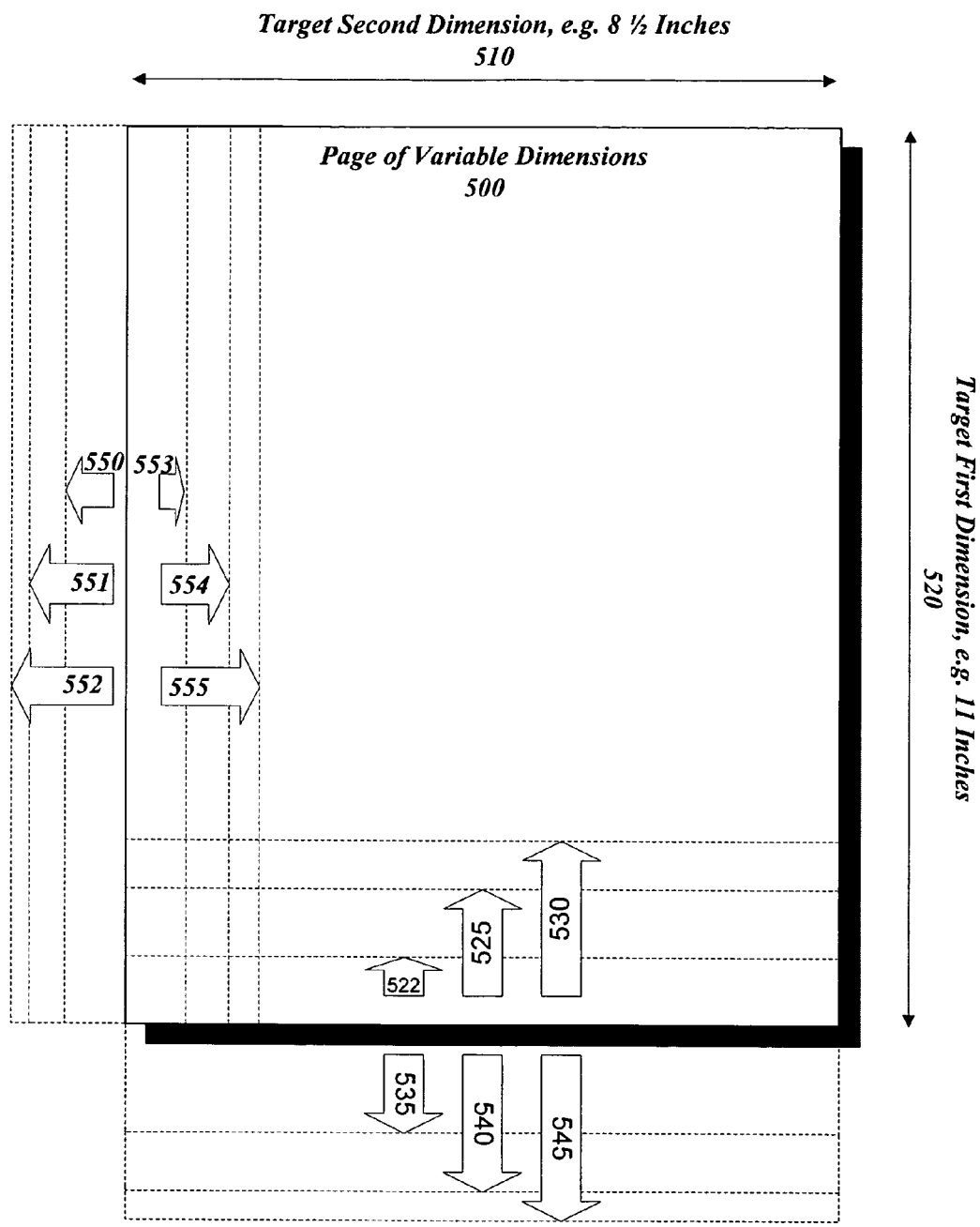
FIG. 5 illustrates a page of variable dimensions that may grow or shrink in both dimensions, length and width, to meet the space requirements of any items that may be placed on it.

It should be noted that while length is used here as an exemplary dimension, width may be treated similarly. Just as items may be approximated in length, they may be approximated in width. Resulting pages that are generated can be of variable width or variable length, or both, as suggested by FIG. 5. FIG. 5 illustrates a page of variable dimensions that may grow or shrink to meet the space requirements of any items that may be placed on it. Arrows 522, 525 and 530 illustrated exemplary lengths less than a target length 520. The page of variable dimensions 500 may result in any such length depending on the length dimensions of the items that are placed on it. Similarly, arrows 535, 540, 545, 550, 551, 552, 553, 554, and 555 represent potential resulting dimensions for the page of variable dimensions 500.

Exemplary Implementation

Various implementation of the invention can allow a document author to specify logical sections, or logical pages, in a document. Any items within a logical section must begin on a new page. In other words, there can be a "hard" page break before a logical section. A document author may also wish to punctuate content of a document with various "hard" page breaks that do not mark a new logical section but are for some other purpose. This is perfectly acceptable, and for our purposes this can be thought of as creating a new logical section.

The document consumer (which may also be the author) can determine what target page dimensions they want to view. Default target dimensions may be presented to the consumer initially, and the consumer can be allowed modify the default. The target page dimensions can be thought of as "soft" page breaks, because by specifying new target page dimensions, a consumer can repaginate a logical section. Thus, a document author can provide hard page breaks to punctuate the content of a document, while a document consumer can provide soft page breaks according to the consumer's preference for viewing the content within each logical section. To use the example of a book, the author can provide logical sections that enforce hard page breaks at each chapter. Readers of the book can then decide for themselves the page size they prefer within each chapter. Consumers have greatly varying preferences in the amount of information that is displayed at once. Some consumers do not mind scrolling through large quantities of information, while others prefer small packets of information.

Figure 6:
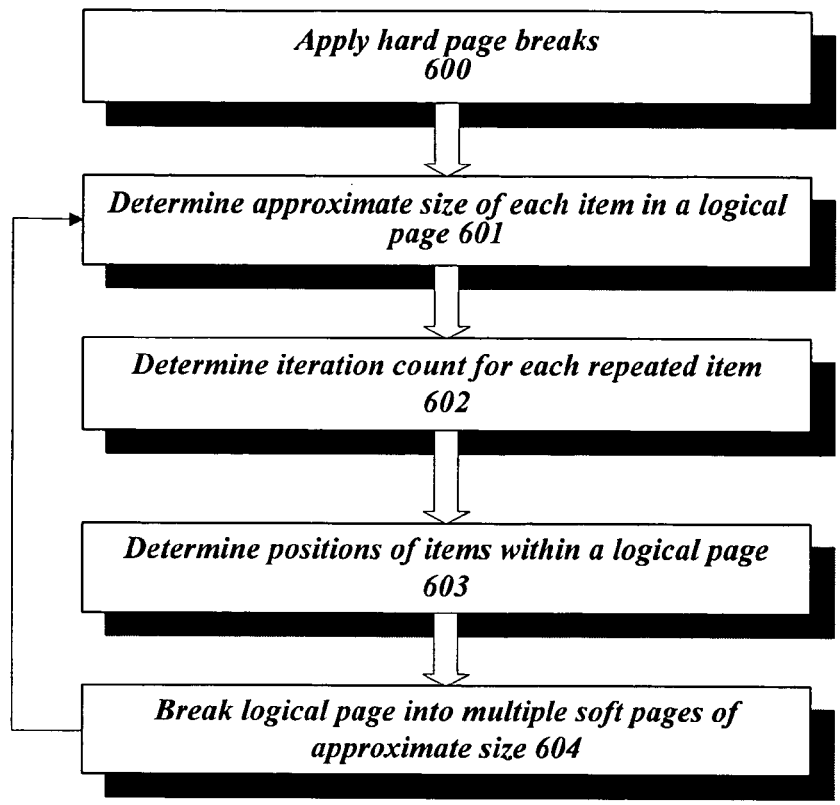
FIG. 6 illustrates a flowchart for pagination of a document in accordance with various embodiments of the invention.

Once the logical sections and target dimensions have been set for a document, the procedure set for the in FIG. 6 can be followed to paginate the document. First, the process that renders pages 600 can apply any hard page breaks dividing logical sections. The next four steps 601, 602, 603 and 604 can be applied to each logical section individually. These four steps 601, 602, 603 and 604 operate to create an approximate layout of all items within a logical section, and then to split the logical sections into soft pages. Each of these steps may be conducted for each section prior to moving on to a subsequent section, or a step or steps may be performed on all sections prior to moving to a next section First, approximate dimensions of each item can be determined 601. As described above with reference to the variable pagination rules, approximate dimensions can be supplied through any of a variety of processes. A preferred method for carrying out this step omits data-specific size changes of items that must be accounted for in fixed pagination. In various embodiments, this step can comprise tagging start points and end points for each item and/or group of items such as items with child items and items with sibling items. Later, when a determination is made as to where to break a logical section into soft pages, the tags can be used as break points so that pages do not split items or groups of items in visually unappealing ways. This technique obviates the need for some of the additional pagination rules that are often used with fixed pagination.

Next, an iteration count for each repeated item can be gathered 602. Third, using the item sizes, the item iteration count, and a set of layout rules such as rules for how items grow due to iteration and rules for how to move items around to account for the growth of other items, the positions of items within a logical page may be determined 603. These three steps may be repeated for each logical page, as illustrated in FIG. 6.

Finally, each logical page may be split into multiple soft pages 604, as needed. This step may be carried out in various embodiments using a set of pagination rules such as rules for how to split items across multiple pages, rules for when to move items to the next page rather splitting, and rules for when to duplicate items on subsequent pages due to other items being split across pages. Each logical page may be split into multiple soft pages. Each soft page may be approximately the target of the target dimensions.

Exemplary Document Production Software

While the systems and methods described herein are considered beneficial in connection with many documents and many types of document production software, such as word processing software, illustration and graphics software, presentation software, communications and email software, webpage design software, spreadsheet software, and so on, one area in which it is considered particularly useful is reporting. This section describes exemplary report processing software for use with the various aspects of the invention described herein.

In any enterprise, data regarding aspects thereof is accumulated over time. This data can be used to report the status of the enterprise. For example, with regard to a sales enterprise, sales data can be accumulated pertaining to each sale of an item, including the salesman, the customer, the region of the salesman, the region of the customer, the amount of the sale, the quantity of the item sold, the date of the sale, the date of the delivery of the sold item, and so on. Based on such sales data, then, it may be that a report is generated that details sales by year, by month, by customer by year, by item by quarter, by salesman by delivery date, by region by week, etc.

The data that populates a report will typically be accumulated in a data source, such as a database. A data source, as the term is used here, is a storehouse for digitally recorded data. To filter the data in a data source into properly organized columns and rows for a report, a report designer may specify, in a report definition, the particular data that is desired from a database. For example, a report designer might specify that he wants a "salesman name" in the first column of a report.

The report designer may then write a program that recognizes the field indicated for the first column of a report definition (salesman name), queries a database for all salesman names, and places them one after the other in the first column of a report. Instead of writing his own program to carry out this task, the report designer may use commercial software that provides this function. Such software may assist a report designer in creating report definitions. The commercial software may also provide the function of automatically analyzing the report definition, quering a database, and placing desired data in a report.

Figure 7:
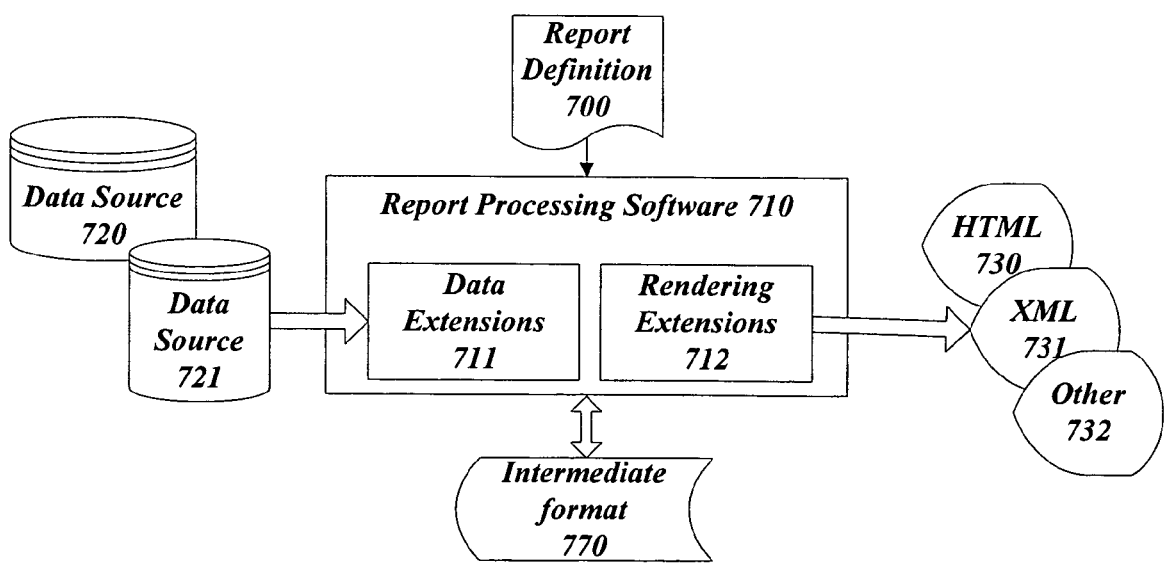
FIG. 7 illustrates exemplary report processing software that can implement the systems and methods provided herein.

Exemplary report processing software for populating a report design with appropriate data is depicted in FIG. 7. The report processing software 710 may comprise a plurality of data extensions for properly interpreting the data stored in any of a plurality of data sources 720 and 721, which could be, e.g., databases. The report processing software 710 may also comprise a number of rendering extensions 712 to properly output reports in an appropriate file format, e.g., Hyper-Text Markup Language (HTML) 730, Extensible Markup Language (XML) 731, or some other file format 732. A report definition 700, also referred to herein as a report design, is used by the report processing software 710 to gather the data from data sources 520, 521 and compile the data into a properly structured report, outputting the report in any file format 530, 531, 532. The report processing software 710 may also generate a report in an intermediate format 770. A report formatted in an intermediate format may subsequently be rendered into any other format by one or more rendering extensions 712. This process is described in greater detail in U.S. patent application Ser. No. 10/400,734, which is hereby incorporated by reference in its entirety.

Variable pagination is especially useful in reporting. Reports are often of such size or quantity that reduction to paper form is not practical. Further, the items in reports may be better served by pages of variable dimensions than by pages of fixed dimensions. Items in a report documents are often of a size that is necessitated, at least in part, by the data that is presented in a report. Moreover, splitting items across multiple pages in reports may be less desirable, because comparisons become more difficult. Because reports present data in a compact form, consumers may be more particular about their preferences for report pagination. Thus, allowing page sizes to automatically vary provides an advance from both a report authoring standpoint and from a report consumption standpoint.

Exemplary Computing and Network Environment

Figure 2A:
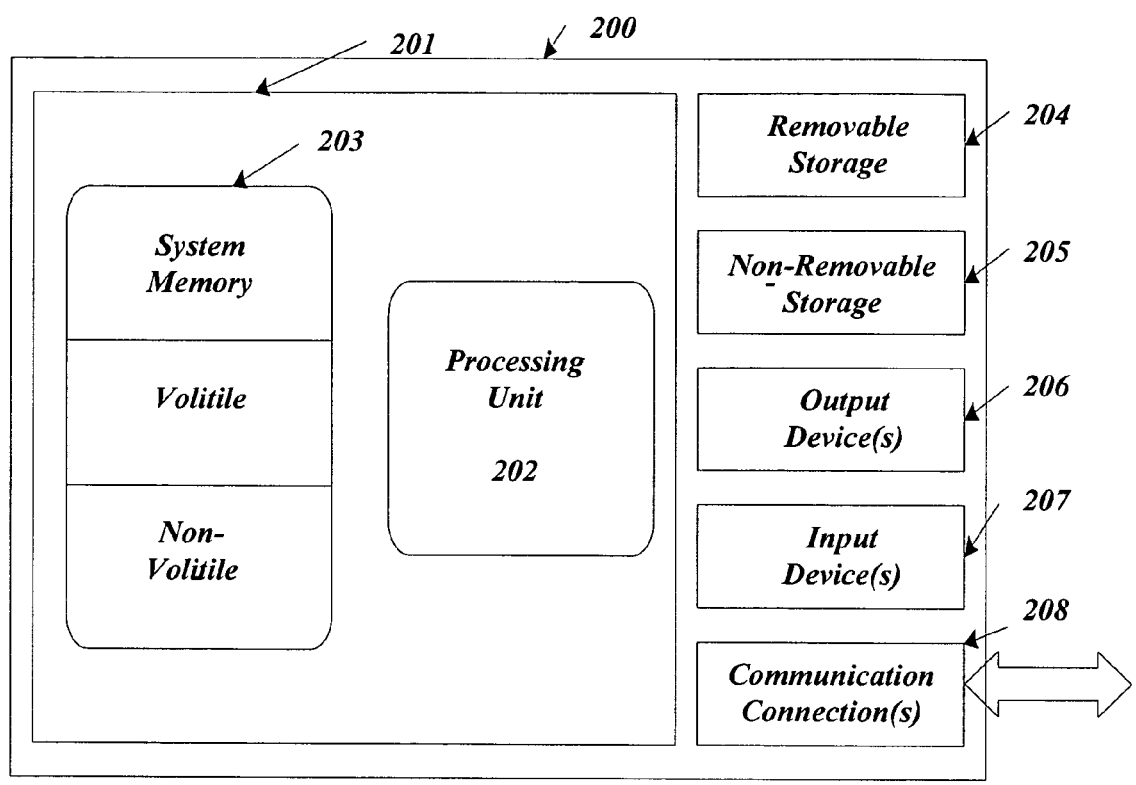
FIG. 2a is a block diagram broadly representing the basic features of an exemplary computing device suitable for use in conjunction with various aspects of the invention.

With reference to FIG. 2a, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

Figure 2B:
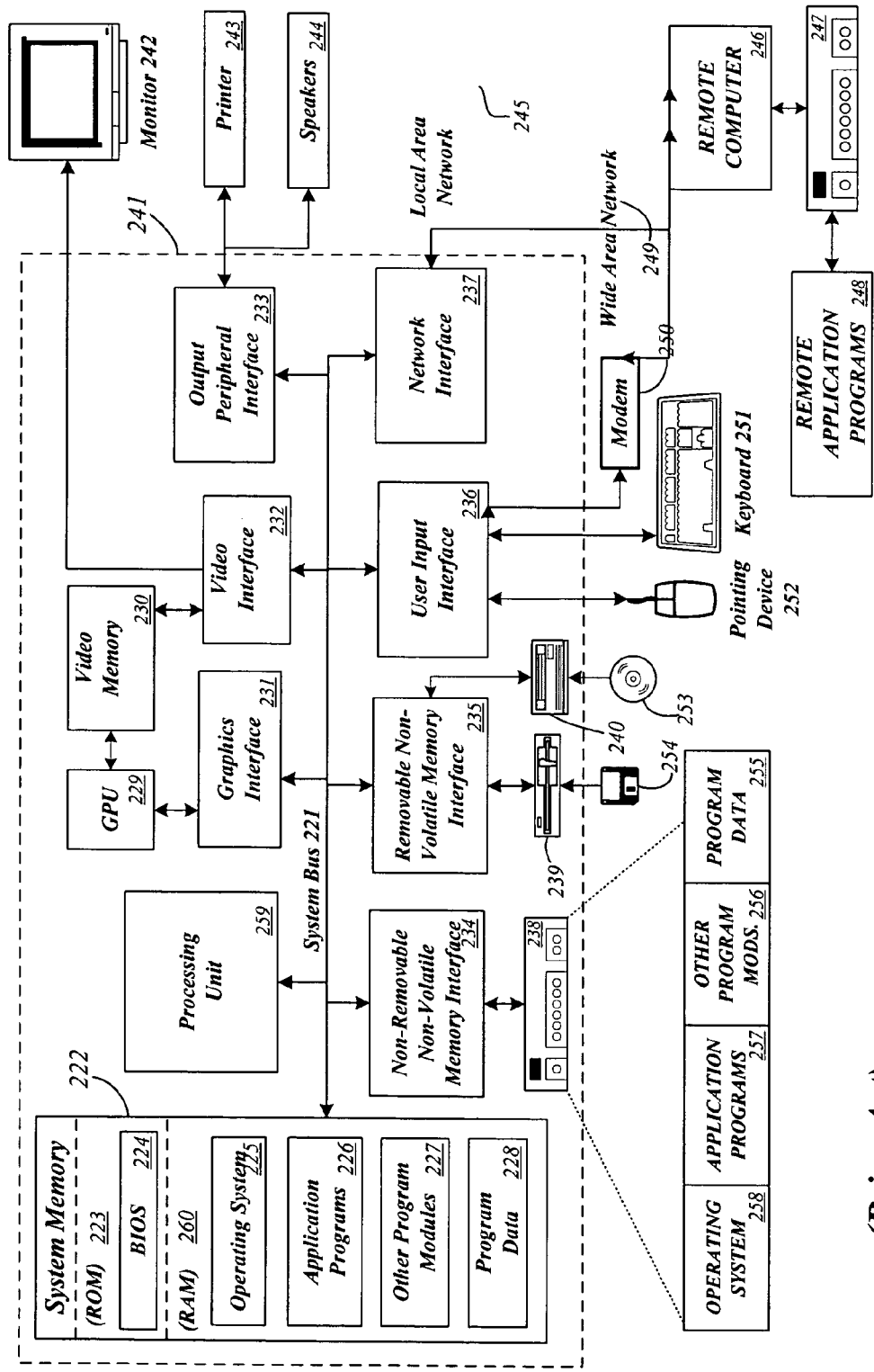
FIG. 2b is a block diagram representing a more detailed exemplary computing device suitable for use in conjunction with various aspects of the invention.

FIG. 2b illustrates a somewhat more detailed example of a suitable computing device from FIG. 2a and peripheral systems. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2b, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2b, provide storage of computer readable instructions, data structures, program modules and other data for the computer 241. In FIG. 2b, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2b include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2b illustrates remote application programs 248 as residing on memory device 247.

It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2C:
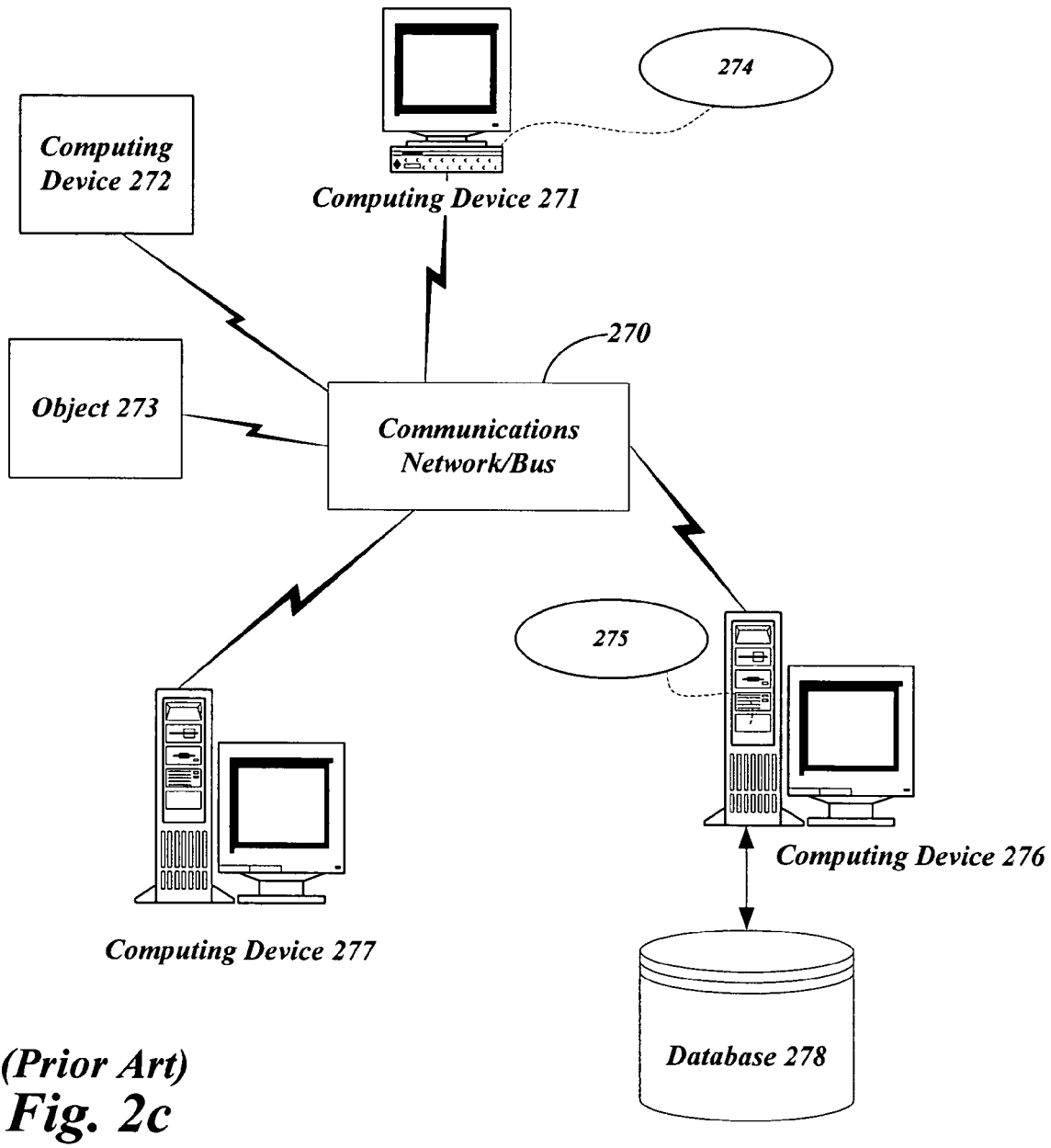
FIG. 2c illustrates an exemplary networked computing environment in which may computerized processes, including those of the invention, may be implemented.

An exemplary networked computing environment is provided in FIG. 2c. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2c provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2c, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2c, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, Hyper Text Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 2a and FIG. 2b, and the further diversification that can occur in computing in a network environment such as that of FIG. 2c, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A method for paginating an electronic document, the method comprising:

receiving a first target page dimension and a second target page dimension for a page of the electronic document, wherein the first target page dimension is associated with a length of the page and the second target page dimension is associated with a width of the page;

determining an approximate first dimension and an approximate second dimension for each item in the electronic document, wherein the approximate first dimension is associated with a length of the respective item and the approximate second dimension is associated with a width of the respective item;

comparing the approximate first dimension to the first target page dimension;

comparing the approximate second dimension to the second target dimension;

determining each item to include on the page of the electronic document based on a result of the comparisons;

adjusting the length of the page if a total of the approximate first dimensions of the items included on the page are greater than or less than the first target page dimension;

adjusting the width of the page if a total of the approximate second dimensions of the items included on the page are greater or less than the second target page dimension; and generating the page of the electronic document, wherein the first and second target page dimensions are treated as approximate page breaks to permit variable pagination where the dimensions of each generated page of the electronic document are permitted to vary among generated pages in order to accommodate items included on each page in the electronic document.

2. The method of claim 1, wherein the approximate first and second dimensions do not account for data-specific size changes.

3. The method of claim 1, further comprising determining an iteration count for a repeated item in the electronic document.

4. The method of claim 1, wherein the electronic document is a report, and at least one item in the report includes a table.

5. The method of claim 1, wherein the first and second target page dimensions are set by a consumer of the electronic document.

6. The method of claim 1, further comprising splitting the electronic document into a plurality of logical sections, wherein each logical section begins on a new page.

7. The method of claim 6, wherein all the items in the electronic document are associated with a single logical section.

8. The method of claim 7, further comprising positioning all the items within the single logical section prior to determining the approximate first and second dimensions.

9. The method of claim 8, wherein the positioning accounts for the approximate first and second dimensions.

10. The method of claim 1, wherein at least one of the first or second target page dimensions is a default target page dimension.

11. The method of claim 1, wherein at least one of the first or second target page dimension is set by an author of the electronic document.

12. The method of claim 1, further comprising tagging a start point and end point for at least one item in the electronic document.

13. A computer readable medium bearing instructions for paginating an electronic document, the computer readable medium comprising:
- instructions for receiving a first target page dimension and a second target page dimension for a page of the electronic document, wherein the first target page dimension is associated with a length of the page and the second target page dimension is associated with a width of the page;
- instructions for determining an approximate first dimension and an approximate second dimension for each item in the electronic document, wherein the approximate first dimension is associated with a length of the respective item and the approximate second dimension is associated with a width of the respective item;
- instructions for comparing the approximate first dimension to the first target page dimension;
- instructions for comparing the approximate second dimension to the second target page dimension;
- instructions for determining each item to include on the page of the electronic document based on a result of the comparisons;
- instructions for adjusting the length of the page if a total of the approximate first dimensions of the items included on the page are greater than or less than the first target page dimension;
- instructions for adjusting the width of the page if a total of the approximate second dimensions of the items included on the page are greater than or less than the second target page dimension; and
- instructions for generating the page of the electronic document, wherein the first and second target page dimensions are treated as approximate page breaks to permit variable pagination where the dimensions of each generated page of the electronic document are permitted to vary among generated pages in order to accommodate items included on each page in the electronic document.

14. The computer readable medium of claim 13, wherein the approximate first and second dimensions do not account for data-specific size changes.

15. The computer readable medium of claim 13, further comprising instructions for determining an iteration count for a repeated item in the electronic document.

16. The computer readable medium of claim 13, wherein the electronic document is a report, and at least one item in the report includes a table.

17. The computer readable medium of claim 13, further comprising instructions for allowing at least one of the first or second page target dimensions to be set by a consumer of the electronic document.

18. The computer readable medium of claim 13, further comprising instructions for splitting the electronic document into a plurality of logical sections, wherein each logical section begins on a new page.

19. The computer readable medium of claim 18, wherein all the items in the electronic document are associated with a single logical section.

20. The computer readable medium of claim 19, further comprising instructions for positioning all the items within the single logical section prior to determining the approximate first and second dimensions.

21. The computer readable medium of claim 20, wherein the positioning accounts for the approximate first and second dimensions.

22. A machine for paginating an electronic document, the machine comprising:
- means for receiving a first target page dimension and a second target page dimension for a page of the electronic document, wherein the first target page dimension is associated with a length of the page and the second target page dimension is associated with a width of the page;
- means for determining an approximate first dimension and an approximate second dimension for each item in the electronic document, wherein the approximate first dimension is associated with a length of the respective item and the approximate second dimension is associated with a width of the respective item;
- means for comparing the approximate first dimension to the first target page dimension;
- means for comparing the approximate second dimension to the second target page dimension;
- means for determining each item to include on the page of the electronic document based on a result of the comparisons;
- means for adjusting the length of the page if a total of the approximate first dimensions of the items included on the page are greater than or less than the first target page dimension;
- means for adjusting the width of the page if a total of the approximate second dimensions of the items included on the page are greater than or less than the second target page dimension; and
- means for generating the page of the electronic document, wherein the first and second target page dimensions are treated as approximate page breaks to permit variable pagination where the dimensions of each generated page of the electronic document are permitted to vary among generated pages in order to accommodate items included on each page in the electronic document.

23. The machine of claim 22, wherein the approximate first and second dimensions do not account for data-specific size changes.

24. The machine of claim 22, further comprising means for determining an iteration count for a repeated item in the electronic document.

25. The machine of claim 22, wherein the electronic document is a report, and at least one item in the report includes a table.

26. The machine of claim 22, wherein at least one of the first or second target page dimensions is set by a consumer of the electronic document.

27. The machine of claim 22, further comprising means for splitting the electronic document into a plurality of logical sections, wherein each logical section begins on a new page.

28. The machine of claim 27, wherein all the items in the electronic document are associated with a single logical section.

29. The machine of claim 28, further comprising means for positioning all the items within the single logical section prior to determining the approximate first and second dimensions.

30. The machine of claim 29, wherein the positioning accounts for the approximate first and second dimensions.

* * * * *